Oct. 20, 1936.    J. W. TATTER    2,057,749
BRAKE MECHANISM
Original Filed Feb. 27, 1928    3 Sheets-Sheet 1
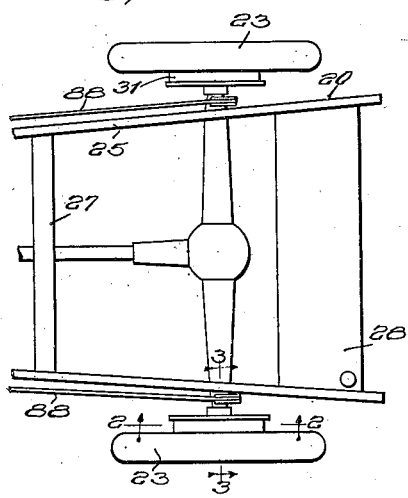
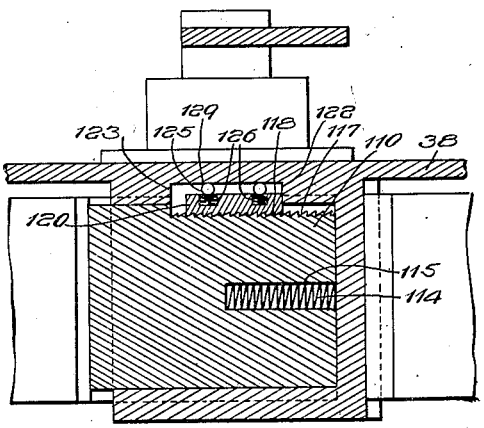
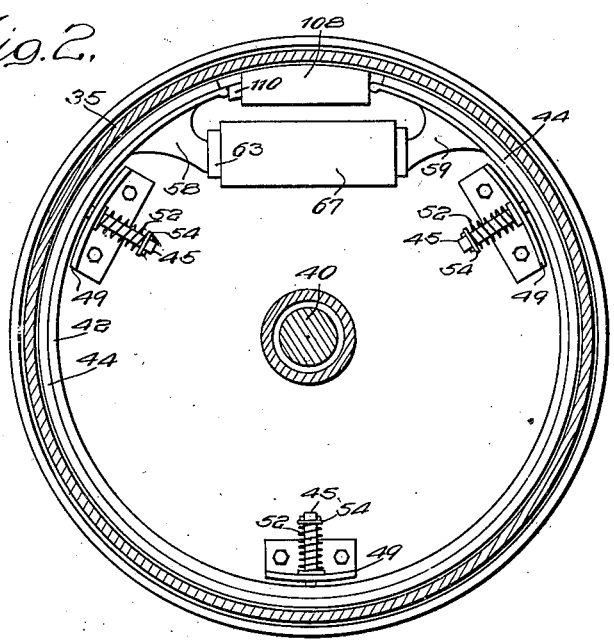
Witness:
William P. Kilroy
Inventor:
John W. Tatter
Hill & Hill
Attys Oct. 20, 1936.  J. W. TATTER  2,057,749
BRAKE MECHANISM
Original Filed Feb. 27, 1928  3 Sheets-Sheet 2

Fig. 3.

Witness:
William P. Kilroy

Inventor:
John W. Tatter
Hill & Hill.
By
Attys

Oct. 20, 1936.  J. W. TATTER  2,057,749
BRAKE MECHANISM
Original Filed Feb. 27, 1928   3 Sheets—Sheet 3

Witness:
William P. Kilroy

Inventor:
John W. Tatter
Hill & Hill
Attys.

Patented Oct. 20, 1936

2,057,749

UNITED STATES PATENT OFFICE 2,057,749

BRAKE MECHANISM

John W. Tatter, Detroit, Mich., assignor, by mesne assignments, to Bendix Products Corporation, South Bend, Ind., a corporation of Indiana Original application February 27, 1928, Serial No. 257,396. Divided and this application December 2, 1929, Serial No. 411,046. Renewed September 16, 1935

9 Claims. (Cl. 188—79.5)

The invention relates to brake mechanism and has among its other objects the provision of brake mechanism which is compact, durable, efficient and satisfactory for use wherever found applicable.

The present application is a division of my copending application, Serial No. 257,396, filed February 27, 1928 for Brake mechanism.

A particular object of the present invention is to provide improved brake mechanism which is self-adjusting to take up slack or wear in the mechanism.

Another particular object of the invention is to provide improved means for preventing undesirable displacement in a brake of the brake band relative to the brake drum.

Still another particular object of the invention is to provide improved means for adjusting a brake band to compensate for wear of the braking surfaces.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a fragmentary plan view of the chassis of an automobile provided with brake mechanism embodying the present invention;

Fig. 2 is an enlarged section taken on line 2—2 of Fig. 1;

Fig. 3 is an enlarged section taken on line 3—3 of Fig. 1;

Fig. 7 is a section taken on line 7—7 of Fig. 4.

Figure 4:
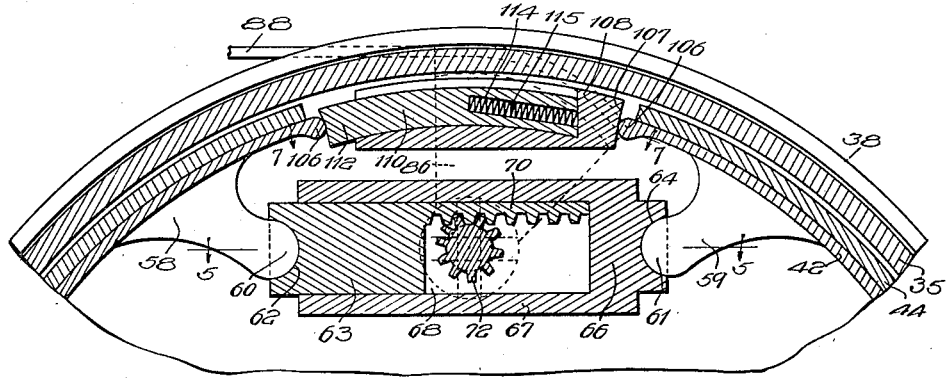
Fig. 4 is a section taken on line 4—4 of Fig. 3.
Figure 5:
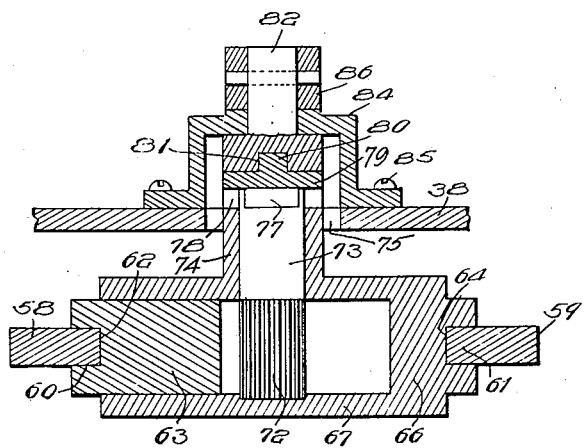
Fig. 5 is a section taken on line 5—5 of Fig. 4.
Figure 6:
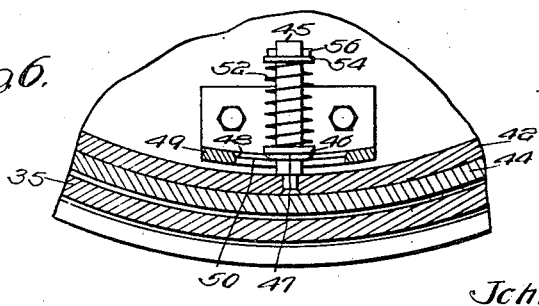
Fig. 6 is a section taken on line 6—6 of Fig. 3.

Referring for the present to Fig. 1, the reference character 20 designates generally a portion of the chassis of an automobile provided, as shown in Fig. 1, with rear wheels 23. In this instance, the chassis 20 comprises longitudinal side members 25 and transverse members 27 and 28. Associated with each of the wheels 23 is a brake, the brakes being identified by the reference characters 31.

The construction of the brakes 31 is best illustrated in Figs. 2, 3, 4, 5, 6 and 7. As best shown in Fig. 3 each brake 31 preferably comprises a brake drum 35 which is preferably secured by bolts 36, or the equivalent, to the associated rear wheel 23. The inner end of the brake drum 35 is preferably closed by a plate or disc 38 which, if desired, may be made integral with the usual rear axle housing 39. The wheel 23 is constrained to rotate with one of a pair of live rear axles 40 disposed within the rear axle housing 39. Disposed within the drum 35 is a brake band or shoe 42 of the internal expanding type which is preferably made from cast iron and is preferably thicker at a point substantially midway between its ends than it is at its ends. Thus, as best shown in Fig. 2, it will be noted that the band 42 is thickest at a point substantially midway between its ends and that it tapers gradually toward its ends. The advantages of this construction are explained in my copending application, Serial No. 145,970, filed November 3, 1926. The outer surface of the brake band 42 is preferably provided with a friction lining 44 which is engageable with the interior surface of the brake drum 35 to prevent rotation of the associated wheel 23.

In the embodiment of the invention illustrated in the drawings, I preferably provide a plurality of pins 45 which are rigidly secured to the brake band 42 and project inwardly therefrom. Any suitable number of pins 45 may be provided but, in this instance, I provide three pins 45 which are equidistantly spaced from each other around the interior surface of the brake band. Slidably mounted upon each pin 45 is a collar 46 which is preferably provided with a frusto conical surface 47 adapted to ride upon a surface 48 provided in a bracket member 49 which is rigidly secured to the plate or disc 38, there being a bracket member 49 for each of the pins 45. As shown, each bracket 49 is slotted as at 50 to accommodate the associated pin 45. The frusto-conical surface 47 of each collar 46 is preferably urged against the associated surface 48 by a compression spring 52 interposed between the collar and a washer 54 which is held upon the pin 45 by a cotter pin 56. When the brake band 42 is contracted, the pins 45, the collars 46 and the springs 52 cooperate to hold the band in a position wherein no part of the brake lining 44 effectively engages the brake drum 35. However, it will be readily understood that the springs 52 are adapted to yield so that the brake band 42 may expand and bring its lining into effective engagement with the brake drum. Also, it is readily understood that the slots 50 permit circumferential displacement of the brake band 42 within the brake drum 35. In other words, the brake band is free to move into a position wherein it can hold its entire lining in effective engagement with the brake drum.

Preferably formed integral with the brake band 42 adjacent the ends thereof are bracket members 58 and 59 (see Fig. 4) which are provided with rounded heads 60 and 61, respectively. The head 60 rests in a slot 62 formed in a plunger or slide 63 and the head 61 rests in a slot 64 formed in an end wall 66 of a cylinder 67, the cylinder 67 being provided with a bore or chamber 68 in which the plunger 63 is slidably journaled. As best shown in Fig. 4, the plunger 63 has a rack 70 formed integral therewith, the gear teeth of the rack 70 being meshed with the gear teeth of a pinion 72 which is preferably formed integral with a relatively short shaft section 73. The shaft section 73 is rotatably journaled in a boss 74 which is preferably formed integral with the cylinder 67 and projects through a relatively large aperture 75 provided in the plate 38. One end of the shaft section 73 is preferably provided with an integral lug 77 which rides in a slot 78 formed in a coupling member 79 and the coupling member 79 is provided with a lug 80 which rides in a slot 81 provided upon one end of a shaft section 82.

It will be noted that the slots 78 and 81 extend at right angles to each other and that the shaft section 82 can drive the shaft section 73 when, in operating the brake mechanism, the shaft 73 has been or is being displaced laterally with respect to the shaft section 82. The shaft section 82 is preferably journaled in a bracket 84 which is secured by screws 85, or the equivalent, to the plate or disc 38 and is preferably constructed so that it closes the aperture 75. Pinned to the shaft 82 is a segment 86 having a peripheral groove 87 which accommodates a cable 88. The cable 88 has one of its ends secured to the segment 86 and has the other of its ends secured to suitable operating means (not shown) for rocking the shaft section 82 in a manner to actuate the brakes associated with the wheels 23, it being understood, of course, that there are two cables 88, one being provided for each of the brakes 31.

It will be readily understood that if the operating means are displaced, the movement will be transmitted to the shaft sections 82 of the brakes 31 through the cables 88. Rotation of the shaft sections 82 is accompanied by like angular displacement of the pinion 72 and the plungers 63 are moved some distance out of the chambers 68 so that the brake linings at the forward ends of the brake bands 42 engage the interior surface of the brake drums. This prevents further displacement of the associated plungers 63 in this direction, and the cylinders 67 by reason of the lug and slot connections 77—78 and 80—81, will be permitted to move in the opposite direction to bring the linings on the other ends of the associated brake bands into engagement with the interior surfaces of the drums. In other words, during the first portion of the rotation of the shaft section 82, the plunger 63 is moved outwardly to the left (Fig. 4) until the forward end of the shoe engages the drum. By this time, either slot 81 and lug 80 or slot 78 and lug 77 have reached a substantially horizontal position, and any further rotation of the shaft section 82 will drive the pinion 72 along the rack 70 thereby displacing the cylinder 67 to the right (Fig. 4), the latter movement being permitted because of the approximately horizontal position of either the slot 81 or slot 78. Of course, this displacement of the two ends of each brake band causes the brake bands to expand so that their entire brake linings come into effective engagement with the interior surfaces of the drums. When the brake bands 42 are being expanded, the cylinders 67 pivot around the shaft sections 73 so that the brake bands may shift into positions which permit them to hold their linings against the drums. It may be mentioned at this point of the discription that each brake band 42 is sufficiently resilient so that it normally assumes the position wherein it is shown in full lines in Fig. 2 so that unless it has been expanded in the manner above described, its brake lining does not effectively engage the interior surface of the drum.

Automatically adjustable means is preferably provided in each of the brakes 31 to limit angular displacement of the brake band around the axis of rotation of its brake drum. As best shown in Figs. 3, 4 and 7, the ends of each brake band 42 are preferably slightly enlarged to provide beads 106. The bead 106 at one end of the brake band slidably engages an arcuate surface 107 formed in one end of a lug or block 108 in which an arcuate slide 110 is mounted. The lug or block 108 is preferably formed integral with the plate or disc 38.

The bead 106 at the other end of the brake band slidably engages an arcuate surface 112 formed in one end of the slide 110. A compression spring 114 disposed in a bore 115 which is formed in the slide 110 urges the slide 110 to the left (Fig. 4). However, the spring 114 is not strong enough to expand the brake band 42. Referring to Fig. 7 it will be noted that the slide 110 is provided with detents or teeth 117 which are engageable by similar detents or teeth 118 formed upon a slide 120 which is also mounted in the lug or block 108. The slide 120 may travel from the position wherein it abuts a shoulder 122 formed in the block 108 to a position wherein it abuts another shoulder 123 formed in the block. In the preferred embodiment of the invention, when a brake lining 44 has not been worn to any appreciable extent and the brake band has not been expanded so that the lining effectively engages the interior surface of the drum, the slide 120 occupies the position wherein it is shown in Fig. 7 and engages the shoulder 122. Compression springs 125 seated in recesses 126 formed in the slide 120 yieldingly urge the slide 120 toward the slide 110 to hold the teeth 118 in engagement with the teeth 117. Steel balls 129 are preferably inserted between the outer ends of the springs 125 and the surface in the block 108 against which the springs act. The balls 129 function as anti-friction devices and permit the slide 120 to move freely between the shoulders 122 and 123 when it is urged in either direction by the slide 110. The construction is preferably such that when the brake band is expanded so that its ends move away from each other, the spring 114 urges the slide 110 to the left (Figs. 4 and 7) and the slide 120 accompanies it, the springs 125 being tensioned so that they hold the teeth 118 in engagement with the teeth 117. Under normal conditions, the brake band will expend to such an extent that the slide 120 will be brought into a position wherein it nearly or actually engages the shoulder 123 when the brake lining effectively engages the brake drum but in the event that the brake lining becomes worn, the slide 120 will engage the shoulder 123 before the brake lining effectively engages the interior surface of the drum. Then, when the brake band continues to expand to bring its brake lining into effective engagement with the interior surface of the brake drum, the spring 114 continues to displace the slide 110 to the left (Figs. 4 and 7) and if the brake lining is sufficiently worn, the teeth 117 will advance the distance of one tooth upon the teeth 118. Then, when the brake band contracts, the slide 120 will engage the shoulder 122 before the slide 110 has returned to its original position within the block 108 and the brake band will be held in a slightly expanded condition. Obviously, the outer surface of the brake lining will then lie in relatively close proximity to the interior surface of the brake drum and it will not be necessary during the succeeding operation to expand the brake band the relatively large amount it was expanded during the preceding operation. Then, when the brake drum tends to angularly displace the brake band around the axis of rotation, the brake band is displaced a relatively small amount as displacement of its ends is limited by the block 108 and the slide 110. This prevents undesirable noises in that the ends of the brake band will not slap against the blocks 108 and the slides 110. The arcuate surfaces 106 and 107 provided upon the slides 110 and the blocks 108, respectively, prevent the ends of the brake bands from riding toward the opposed surfaces on the drums and thus causing undue wear of the brake linings at these points.

It will be noted that when the brake operating means is actuated to apply the brakes, the segment 86, by reason of its connection with the operating cable 88, will be angularly displaced in a counter clockwise direction (Fig. 4) and the shaft sections 82 and 73 together with the pinion 72 will be angularly displaced in a like direction in a manner to produce a relative longitudinal movement of the plunger 63 and cylinder 67 for expanding the brake band 42 and lining 44 into engagement with the brake drum 35.

Having thus described the invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A brake comprising a brake drum, a brake band operatively positioned with respect to said drum, and means engageable by the ends of the brake band for preventing said brake drum from angularly displacing said brake band, said means comprising a relatively fixed member engageable with one end of said band, a relatively movable member slidably mounted in said fixed member and engageable with the opposite end of said band, and means slidably movable with respect to both said members and engageable therewith for positioning the ends of said band in a plurality of adjusted positions with respect to each other.

2. A brake comprising a brake drum, a brake band operatively positioned with respect to said drum, and means engageable by the ends of the brake band for preventing said brake drum from angularly displacing said brake band, said means comprising a relatively fixed member engageable with one end of said band, a relatively movable member slidably mounted in said fixed member and engageable with the opposite end of said band, and means slidably mounted in said fixed member and having a limited movement with respect thereto, said last mentioned means being adjustably related to said movable member for positioning the ends of said band in a plurality of adjusted positions with respect to each other.

3. A brake comprising a brake drum, a brake band operatively positioned with respect to said drum, and means engageable by the ends of the brake band for preventing said brake drum from angularly displacing said brake band, said means comprising a member having a recess formed therein and engageable with one end of said band, a second member engageable with the opposite end of said band and relatively movable with respect to said recessed member, and means mounted in said recess and adjustably related to said second member for positioning the ends of said band in a plurality of adjusted positions with respect to each other.

4. A brake comprising a brake drum, a brake band operatively positioned with respect to said drum, and means engageable by the ends of the brake band for preventing said brake drum from angularly displacing said brake band, said means comprising a member having a recess formed therein and engageable with one end of said band, a second member engageable with the opposite end of said band and relatively movable with respect to said recessed member, a plurality of teeth formed on said second member, and a toothed detent movably mounted in said recess and engageable with the teeth formed on said second member for positioning the ends of said band in a plurality of adjusted positions with respect to each other.

5. A brake comprising a brake drum, a brake band, and automatically adjustable means engageable with the ends of said brake band for preventing said drum from angularly displacing said band, said means comprising a member having a plurality of shoulders formed thereon and engageable with one end of said band, a second member engageable with the opposite end of said band and relatively moveable with respect to said shouldered member, and means movably mounted between said shoulders and adjustably related to said second member, said last mentioned means being engageable with one of said shoulders for changing the relative position of said last means with respect to said second member when the brake band ends are moved relatively in one direction, and engageable with the other of said shoulders when the brake band ends are moved relatively in the opposite direction for spacing the brake band in relation to said drum.

6. A brake comprising a brake drum, a brake band, and automatically adjustable means engageable with the ends of said brake band for preventing said drum from angularly displacing said band, said means comprising a relatively fixed member having a plurality of shoulders formed thereon and engageable with one end of said band, a toothed member engageable with the opposite end of said band and relatively movable with respect to said fixed member, and a slide having a limited movement between said shoulders and having teeth engageable with the teeth of said toothed member, said slide being engageable with one of said shoulders for changing the relative position of the slide with respect to said toothed member when the brake band ends are moved relatively in one direction or toward said drum, and engageable with the other of said shoulders when the brake band ends are moved relatively in the opposite direction for spacing the brake band in relation to said drum.

7. A brake comprising a brake drum, a brake band operatively positioned with respect to said drum, and means engageable by the ends of the brake band for preventing said brake drum from angularly displacing said brake band, said means comprising a member having a recess formed therein and engageable with one end of said band, a second member engageable with the opposite end of said band and slidably movable with respect to said recessed member, a plurality of teeth formed on said second member, and a toothed member movably mounted in said recess and engageable with the teeth formed on said second member for positioning said band with respect to said drum.

8. A brake comprising a brake drum, a brake shoe formed with a rim section and a section extending perpendicular to said rim section and substantially parallel to the supporting plate, a lining supported by said rim section, an anchor on which said rim section anchors, and an applying means having elements contacting with said perpendicular section for applying the friction means to the drum.

9. A brake comprising a brake drum, a supporting plate, a brake shoe formed with a rim section and a section extending perpendicular to said rim section and substantially parallel to the supporting plate, a lining supported by said rim section, an anchor secured directly to said supporting plate having portions on which said rim section anchors, and an applying means having elements contacting with said perpendicular section for applying the friction means to the drum.

JOHN W. TATTER.